(12) United States Patent
Liu et al.

(10) Patent No.: US 11,348,605 B1
(45) Date of Patent: May 31, 2022

(54) WRITER WITH ADAPTIVE SIDE GAP

(71) Applicant: Headway Technologies, Inc., Milpitas, CA (US)

(72) Inventors: Ying Liu, San Jose, CA (US); Yuhui Tang, Milpitas, CA (US); Yue Liu, Fremont, CA (US); Jiun-Ting Lee, Sunnyvale, CA (US); Shengyuan Wang, San Jose, CA (US); Xiaomin Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/953,925

(22) Filed: Nov. 20, 2020

(51) Int. Cl.
| | |
|---|---|
| *G11B 5/31* | (2006.01) |
| *G11B 5/23* | (2006.01) |
| *G11B 5/48* | (2006.01) |
| *G11B 5/11* | (2006.01) |
| *G11B 5/127* | (2006.01) |
| *G11B 5/00* | (2006.01) |

(52) U.S. Cl.
CPC .............. *G11B 5/315* (2013.01); *G11B 5/11* (2013.01); *G11B 5/1278* (2013.01); *G11B 5/23* (2013.01); *G11B 5/314* (2013.01); *G11B 5/3133* (2013.01); *G11B 5/3146* (2013.01); *G11B 5/4866* (2013.01); *G11B 2005/0021* (2013.01); *G11B 2005/0024* (2013.01)

(58) Field of Classification Search
None
See application file for complete search history.

(56) References Cited

U.S. PATENT DOCUMENTS

| | | |
|---|---|---|
| 6,785,092 B2 | 8/2004 | Covington et al. |
| 6,809,899 B1 | 10/2004 | Chen et al. |
| 6,954,340 B2 | 10/2005 | Shukh et al. |
| 7,009,812 B2 | 3/2006 | Hsu et al. |
| 7,589,600 B2 | 9/2009 | Dimitrov et al. |
| 7,724,469 B2 | 5/2010 | Gao et al. |
| 7,835,111 B2 | 11/2010 | Flint et al. |
| 7,957,098 B2 | 6/2011 | Yamada et al. |

(Continued)

FOREIGN PATENT DOCUMENTS

| | | |
|---|---|---|
| JP | 2002-133610 | 5/2002 |
| JP | 2002-298309 | 10/2002 |

(Continued)

OTHER PUBLICATIONS

"Hysteretic Behavior of the Dynamic Permeability on a Ni—Fe Thin Film," by O. Archer et al., Physical Review B, vol. 68, Issue 18, 184414 (2003), Nov. 1, 2003, pp. 1-4.

(Continued)

*Primary Examiner* — Jefferson A Evans
(74) *Attorney, Agent, or Firm* — Saile Ackerman LLC; Stephen B. Ackerman

(57) ABSTRACT

A PMR (perpendicular magnetic recording) write head configured for thermally assisted magnetic recording (TAMR) and microwave assisted magnetic recording (MAMR) is made adaptive to writing at different frequencies by inserting thin layers of magnetic material into the material filling the side gaps (SG) between the magnetic pole (MP) and the side shields (SS). At high frequencies, the thin magnetic layers saturate and lower the magnetic potential of the bulky side shields.

14 Claims, 6 Drawing Sheets

(56) References Cited

U.S. PATENT DOCUMENTS

| | | | |
|---|---|---|---|
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,264,792 B2 | 9/2012 | Bai et al. | |
| 8,270,112 B2 | 9/2012 | Funayama et al. | |
| 8,295,008 B1 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,477,452 B2 | 7/2013 | Sasaki et al. | |
| 8,493,687 B2 | 7/2013 | Sasaki et al. | |
| 8,582,240 B1 | 11/2013 | Chen et al. | |
| 8,582,241 B1 | 11/2013 | Yu et al. | |
| 8,604,886 B2 | 12/2013 | Nikonov et al. | |
| 8,605,386 B1 | 12/2013 | Ohtake et al. | |
| 8,634,163 B2 | 1/2014 | Tanabe et al. | |
| 8,670,213 B1* | 3/2014 | Zeng | G11B 5/3116 360/125.3 |
| 8,749,919 B2 | 6/2014 | Sasaki et al. | |
| 8,755,150 B2 | 6/2014 | Chen et al. | |
| 8,767,347 B1 | 7/2014 | Sasaki et al. | |
| 8,792,210 B2 | 7/2014 | de la Fuente et al. | |
| 9,142,228 B2 | 9/2015 | Fujita et al. | |
| 9,230,571 B1 | 1/2016 | Chen et al. | |
| 9,299,367 B1 | 3/2016 | Tang et al. | |
| 9,355,654 B1 | 5/2016 | Mallary | |
| 9,355,655 B1 | 5/2016 | Udo | |
| 9,361,912 B1 | 6/2016 | Liu et al. | |
| 9,406,317 B1 | 8/2016 | Tang et al. | |
| 9,466,319 B1 | 10/2016 | Tnag et al. | |
| 9,805,745 B1* | 10/2017 | Takagishi | G11B 5/3116 |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 10,032,469 B2 | 7/2018 | Lim et al. | |
| 10,032,470 B1 | 7/2018 | Degawa | |
| 10,037,772 B2 | 7/2018 | Okamura et al. | |
| 10,109,302 B1 | 10/2018 | Shinohara | |
| 10,121,497 B1 | 11/2018 | Takahashi | |
| 10,157,632 B1* | 12/2018 | Song | G11B 5/315 |
| 10,181,334 B1* | 1/2019 | Song | G11B 5/3133 |
| 10,210,888 B1* | 2/2019 | Li | H01L 43/04 |
| 10,325,618 B1* | 6/2019 | Wu | G11B 5/11 |
| 10,366,714 B1 | 7/2019 | Olson | |
| 10,424,326 B1 | 9/2019 | Chen et al. | |
| 10,438,616 B2 | 10/2019 | Yamada et al. | |
| 10,490,216 B1 | 11/2019 | Chen et al. | |
| 10,522,174 B1 | 12/2019 | Chen et al. | |
| 10,789,976 B2* | 9/2020 | Narita | G11B 5/235 |
| 10,832,710 B1* | 11/2020 | Song | G11B 5/3909 |
| 10,839,831 B1* | 11/2020 | Nguyen | G11B 5/23 |
| 2002/0034043 A1 | 3/2002 | Okada et al. | |
| 2004/0150910 A1 | 8/2004 | Okada et al. | |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0177301 A1 | 8/2007 | Han et al. | |
| 2007/0211379 A1* | 9/2007 | Kato | G11B 5/1278 360/125.03 |
| 2008/0013209 A1 | 1/2008 | Sasaki et al. | |
| 2008/0088972 A1 | 4/2008 | Sasaki et al. | |
| 2009/0059426 A1 | 3/2009 | Sasaki et al. | |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2011/0211271 A1 | 9/2011 | Ng et al. | |
| 2011/0279921 A1 | 11/2011 | Zhang | |
| 2012/0075748 A1* | 3/2012 | Kief | G11B 5/3116 |
| 2012/0126905 A1 | 5/2012 | Zhang | |
| 2012/0292723 A1 | 11/2012 | Luo et al. | |
| 2013/0082787 A1 | 4/2013 | Zhang | |
| 2014/0071562 A1 | 3/2014 | Chen et al. | |
| 2014/0133048 A1 | 5/2014 | Shiimoto | |
| 2014/0177092 A1 | 6/2014 | Katada et al. | |
| 2014/0177100 A1* | 6/2014 | Sugiyama | G11B 5/1278 360/125.03 |
| 2015/0043106 A1 | 2/2015 | Yamada et al. | |
| 2015/0124347 A1 | 5/2015 | Shimoto | |
| 2015/0310881 A1* | 10/2015 | Koui | G11B 5/314 360/235.4 |
| 2016/0086623 A1 | 3/2016 | Nagasaka | |
| 2016/0218728 A1 | 7/2016 | Zhu | |
| 2017/0076741 A1* | 3/2017 | Tang | G11B 5/3146 |
| 2017/0076742 A1* | 3/2017 | Tang | G11B 5/3169 |
| 2017/0133044 A1 | 5/2017 | Lim et al. | |
| 2017/0309301 A1 | 10/2017 | Takahashi | |
| 2018/0075868 A1 | 3/2018 | Koui et al. | |
| 2019/0244634 A1* | 8/2019 | Goncharov | G11B 5/23 |
| 2019/0259413 A1* | 8/2019 | Le | G11B 5/3133 |

FOREIGN PATENT DOCUMENTS

| | | |
|---|---|---|
| JP | 2008-021398 | 1/2008 |
| JP | 2010-157303 | 7/2010 |

OTHER PUBLICATIONS

PTO Office Action, U.S. Appl. No. 12/964,202, Applicant: Sasaki et al., dated Nov. 28, 2012, 11 pages.

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation.

Nov. 13, 2012, Office Action issued in Japanese Patent Application No. 2011-149243, with English language translation.

Nov. 13, 2012, Office Action issued in Japanese Patent Application No. 2011-149244, with English language translation.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al., 2012 American Chemical Society, Jun. 4, 2012, vol. 6, No. 7, pp. 5115-6121.

U.S. Notice of Allowance, U.S. Appl. No. 16/209,151, First named Inventor: Wenyu Chen, dated Aug. 15, 2019, 17 pages.

U.S. Notice of Allowance, U.S. Appl. No. 16/549,139, First named Inventor: Wenyu Chen, dated Sep. 19, 2019, 8 pages.

U.S. Notice of Allowance, U.S. Appl. No. 16/197,586, First named Inventor: Wenyu Chen, dated May 15, 2019, 16 pages.

* cited by examiner

WRITER WITH ADAPTIVE SIDE GAP

RELATED PATENT APPLICATIONS

This application is related to U.S. Pat. Nos. 10,522,174, 10,490,216, and 10,424,326 all of which are assigned to a common assignee and fully incorporated by reference.

BACKGROUND

1. Technical Field

This disclosure relates generally to a thin-film magnetic writer and particularly to the structure of the gaps surrounding the main pole (MP).

2. Background

As Hard Disk Drive (HDD) requires higher and higher areal density capability. Both tracks per inch (TPI) and bits per inch (BPI) need to be larger. Because higher TPI requires smaller Main Pole (MP) size, the writability under high frequency writing will be a major challenge for next generation HDD writer head.

In the current writer design, the MP is surrounded by a trailing shield (TS), a side shield (SS) and a leading shield (LS) and separated from them by gaps, typically filled with a wide range of non-magnetic materials. It is critical to optimize the gap width between the MP and these surrounding shields. Smaller gap width will enhance a shielding effect and sharpen the written bit pattern, while larger gap width can help release MP flux and promote writability. Because low frequency writing benefits more from written pattern sharpness whereas high frequency writing is hungry for writability (i.e., strength of MP field), a gap width that can adapt writing frequency is strongly desired.

SUMMARY

In this disclosure we propose a new design for the gap structure that separates the main pole (MP) from its surrounding shields. Specifically, we deposit thin layers of non-magnetic material and magnetic material sequentially on top of a normal side shield (SS) and/or leading shield (LS). Because the thin magnetic layers are decoupled from the bulky shielding material, the thin magnetic layers can help absorb the gap field and reduce bulky shield magnetic potential, while protecting against write bubble fringing and reducing erase width of an AC field (EWAC).

The thin magnetic layers can have a different frequency response than the bulky shields. In low frequency writing, the thin layers will have higher permeability and provide normal shielding. Under high frequency conditions, however, the thin layers will have lower permeability and the effective gap size will become larger. As a result, the gap structure is adaptable to varying recording conditions, MP flux release is improved and writability is enhanced.

Finally, the improved performance of the PMR writer makes it particularly well designed to operate in conjunction with thermally assisted magnetic recording (TAMR) and microwave assisted magnetic recording (MAMR). As is now well known in the art and so will not be further described herein, TAMR reduces the coercivity of a region of a recording medium on which recording is to occur by raising its temperature, typically using the optical field energy of a laser to create plasmons whose near-fields are not diffraction limited and, therefore, can be finely focused on the recording spot of the magnetic medium.

One form of MAMR achieves an analogous result as TAMR, but with a different mechanism. This form, called a spin-torque oscillator (STO), typically operates by applying a microwave frequency field to the recording media, creating a resonant precessional motion in the magnetic bits. This excess energy allows the bits to make magnetic transitions more readily, effectively reducing the coercivity of the magnetic medium.

The second form of MAMR, which we will call spin-assisted writing (SAW), effectively enhances the write-field impinging directly on the media surface from the pole tip by enhancing the flux between the magnetic pole tip and the trailing shield. This enhancement of the field leaving the pole tip is produced by generating a counter-field to the field within the write-gap by using a spin-torque layer in combination with a flux guiding layer to produce a field that is counter to the field generated by the pole. Thus, instead of giving more energy to the magnetic bits by the RF precessional field, it enhances the write field that impinges upon them by eliminating the field within the write gap. Both of these recording assist technologies will be well suited to operating along with the improved writability of the presently disclosed PMR with an adaptable gap design.

Referring to FIG. 1C, there is shown a schematic side cross-sectional view of the distal end of the PMR write head. The write pole is 10, the trailing shield is 150, a spin polarization layer is 170, a flux control layer is 160. In this figure the flux control layer creates a magnetic field 190 that is opposite to the gap field 180 and reduces it. As a result, the field emanating from the pole 10 is strengthened and can cause bit reversals without the need for RF oscillations.

DETAILED DESCRIPTION

Figure 1A:
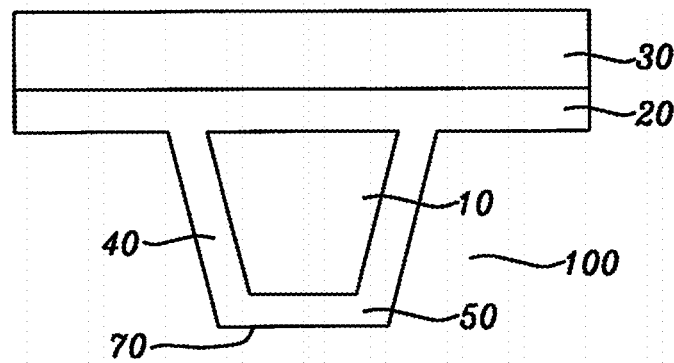
FIG. 1A is a schematic illustration of the ABS of a prior art write head showing a write gap (WG) and side gaps (SG).

Referring to FIG. 1A there is shown a prior art write head in an ABS view. The trapezoidal cross-section of the MP tip 10 is separated from magnetic shield material 100 by a series of surrounding gaps that are here filled with dielectric (non-magnetic) material. The gaps are formed by separations between the inner edges of the side shields (SS), the trailing shield (TS) and the leading shield (LS) and outer edges of the trapezoidal cross-sectional shape of the MP.

A write gap (WG) 20 covers the trailing edge of the MP 10 and extends laterally and symmetrically over the trailing edge and terminates beyond the width of the trailing edge. Magnetic shield material 30 of the trailing shield (TS) covers the WG 20. The downward sloping sides of the MP are each covered by side gaps (SG) 40 that are connected by a leading gap (LG) 50. The side gaps contact the material of the side shields 100 (SS) and the leading gap (LG) 50 contacts the leading shield (LS) material 70. During operation, the flux lines of the magnetic recording field emanate from the trapezoidal tip of the MP 10, strike the recording medium (not shown) and return to the surrounding shields to complete the flux path.

Figure 1B:
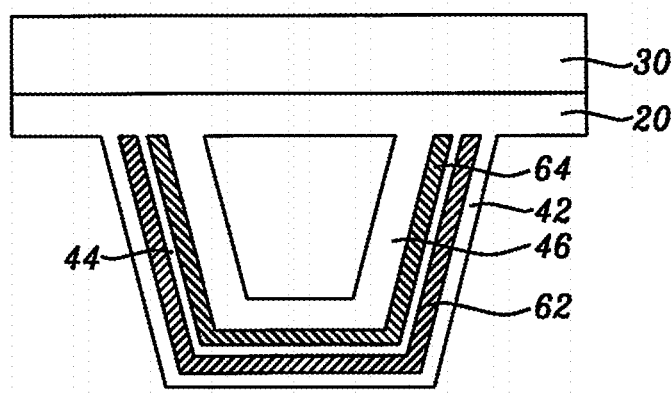
FIG. 1B is a schematic illustration of the ABS view of the presently disclosed write head, showing the layered construction of the side gaps.
Figure 1C:
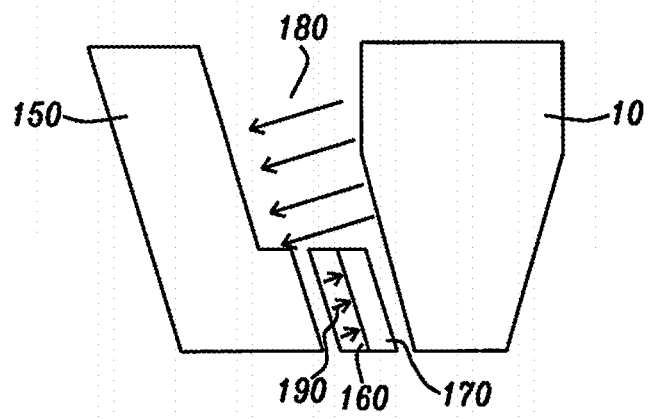
FIG. 1C is a schematic illustration of main pole tip (MP), a trailing shield and a spin polarization layer and flux control layer as they would be configured for spin-assisted writing.

Referring to schematic FIG. 1B, there is shown the structure provided by the present disclosure. In the structure of FIG. 1B there is shown that three layers of dielectric (non-magnetic) material 42, 44 and 46 and two layers of magnetic material 62 and 64 are deposited sequentially in the side gaps (SG) and leading gap (LG). The structure can include a single thin magnetic layer surrounded by dielectric material (not shown), or it can include several nested magnetic layers as shown in FIG. 1B. Note also that the thin magnetic layers are separated from the MP and shields by a layer of dielectric 42, 46 to decouple them from the bulkier magnetic material of the MP and shields.

Figure 2A:
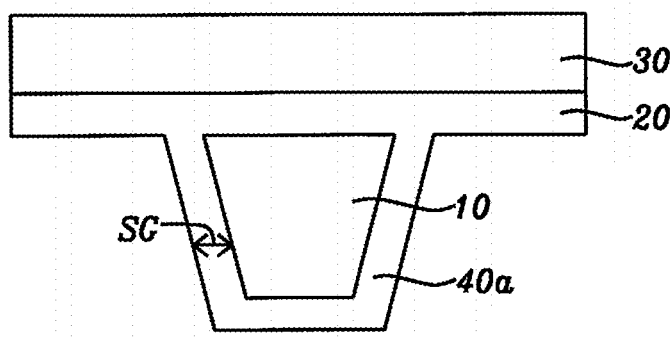
FIG. 2A is a schematic illustration of the ABS of the prior art write head of FIG. 1A showing the SG with a width of 35 nm for the purposes of a simulation.

To demonstrate the performance of this presently disclosed structure, several simulations using magnetic modeling were carried out. Referring to FIG. 2A, there is shown a prior art structure with a SG 40a of 35 nm (nanometers) width that is in all respects identical to SG 40 in FIG. 1A except it is to be used in a finite element analysis, so an SG width 0f 35 nm has been assigned to it. We note that the thickness of each non-magnetic layer can vary from 1 nm to 50 nm and the thickness of each magnetic layer can vary from 1 nm to 50 nm.

Figure 2B:
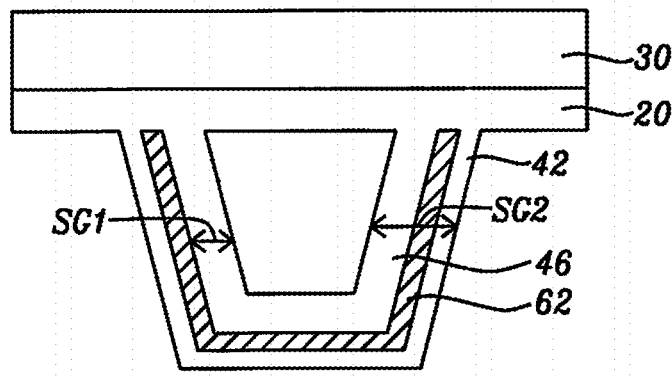
FIG. 2B is a schematic illustration of the ABS of the presently disclosed write head, showing SG1 with a width of 35 nm and SG2 with a width of 60 nm, for the purposes of the simulation.

Referring to FIG. 2B there is shown the new structure in which a single thin magnetic layer 62 of 20 nm thickness has been formed inside the two side gaps SG and the leading gap LG. The symbol SG1 is the gap between MP and the nearest magnetic layer and SG2 denotes the width between the pole and side shield.

The magnetic layer 62 is separated from the MP 10 by dielectric layer 46 having a width shown as SG1 and from side shield 100 by dielectric layer 42. Separating the magnetic layer 62 from the shield 100 and pole 10 is required in order to decouple the magnetic layer from the bulkier magnetic shields and pole.

Figure 2C:
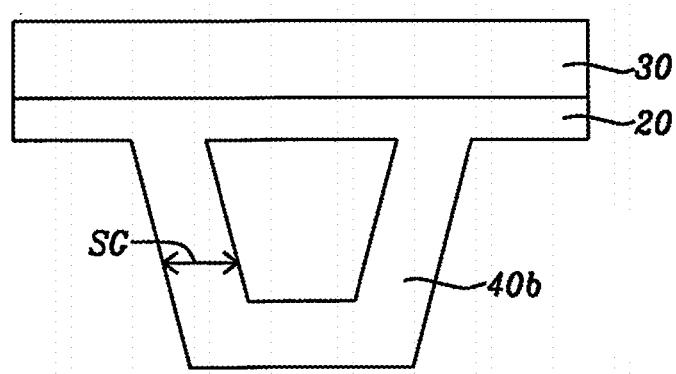
FIG. 2C is a schematic illustration of the ABS of the prior art write head of FIG. 1A showing the SG with a width of 60 nm for the purposes of the simulation.

FIG. 2C shows the same prior art structure as FIG. 2A, except that the thickness of the gap 40a in FIG. 2A is taken to be 35 nm for the purpose of a simulation, while the thickness of the gap 40b in prior art FIG. 2C is taken to be 60 nm for the purpose of a simulation.

Figure 3A:
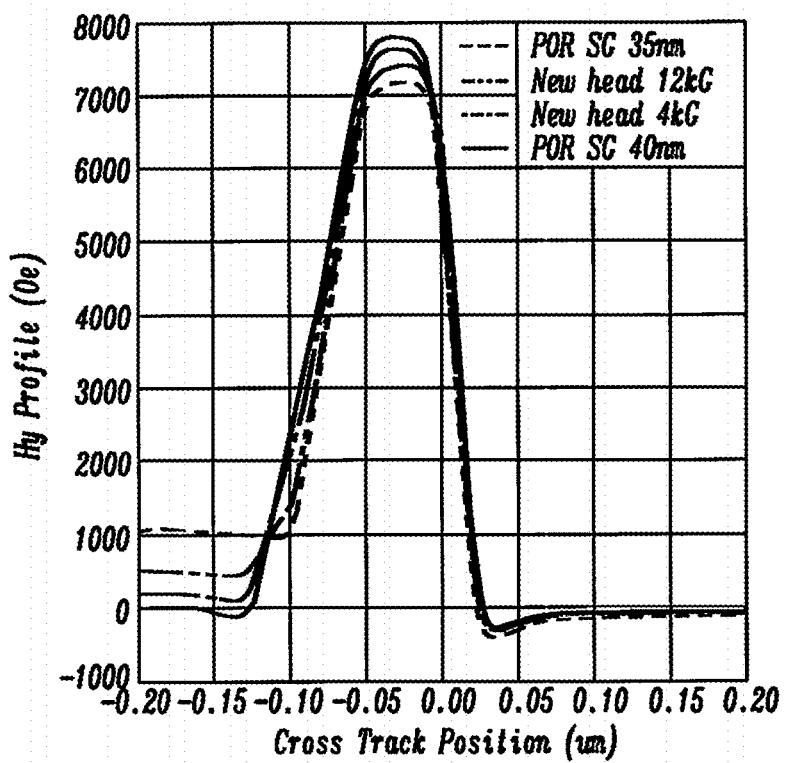
FIG. 3A is a graphical plot of the simulated downtrack Hy, measured in Oersteds (Oe), of 4 different head designs.

Referring to FIG. 3A, there are shown simulated profiles (under static conditions) of the down-track (in μm) strength of Hy (in Oersteds) for four different simulated structures, two prior art heads with no embedded thin magnetic layer and with the dielectric thicknesses being 35 nm and 40 nm and with two of the new designs, in which the SG thickness is 35 nm and the embedded thin magnetic layer has a total Ms of 12 kG or 4 kG (kilogauss).

Figure 3B:
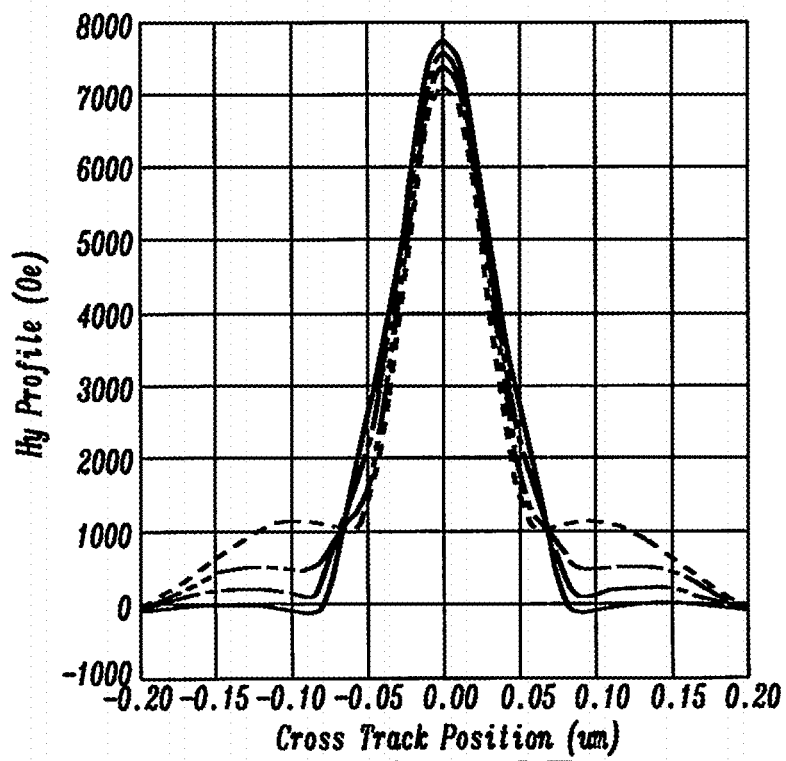
FIG. 3B is a graphical plot of the simulated crosstrack Hy plot of the 4 different head designs of FIG. 3A.

The profiles shown in FIG. 3B are for the same four heads, but now simulating their cross-track (in μm) values of Hy. Looking at the two sets of profiles, it can be seen that the new designs (with embedded layers) enhance the maximum Hy peak height, while EWAC confinement (profile width) is as good as is obtained with the prior art designs (no embedded layers). The results also demonstrate that the thin magnetic layer saturates and helps to lower the magnetic potential of the bulky side shield. As a result, for all frequency domains, writability can be gained without the loss of write bubble fringing and also improving skip track erasure.

Figure 4A:
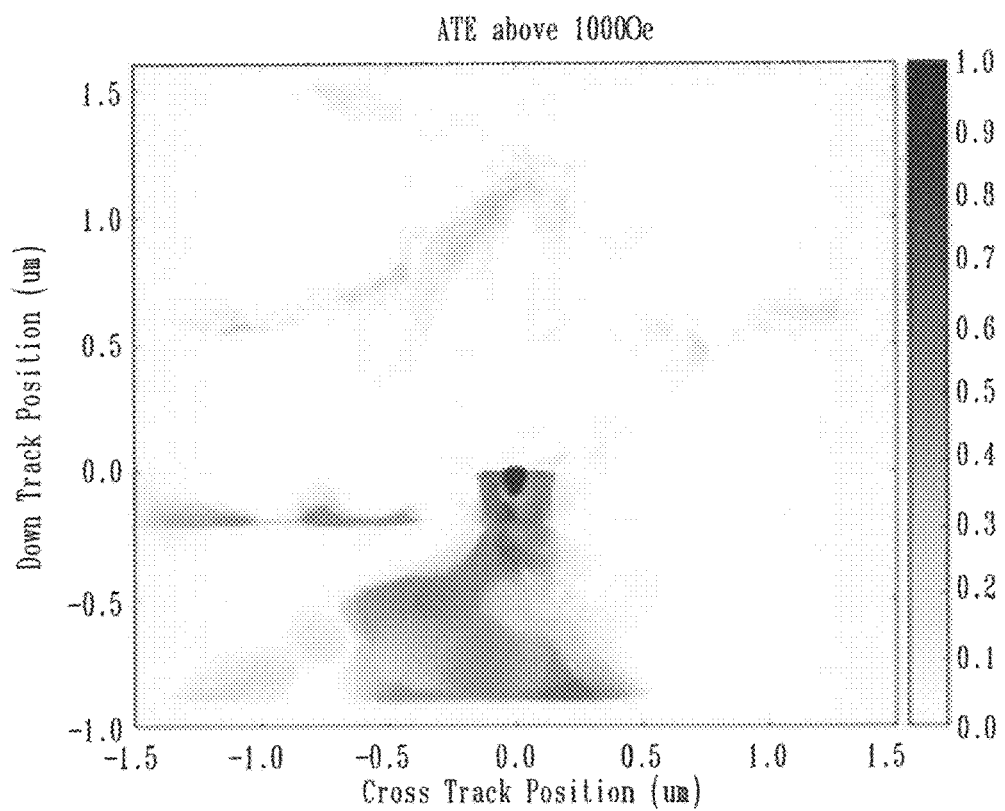
FIG. 4A shows dynamic adjacent track erasure (ATE) mapping from the modeling result for a prior art design.
Figure 4B:
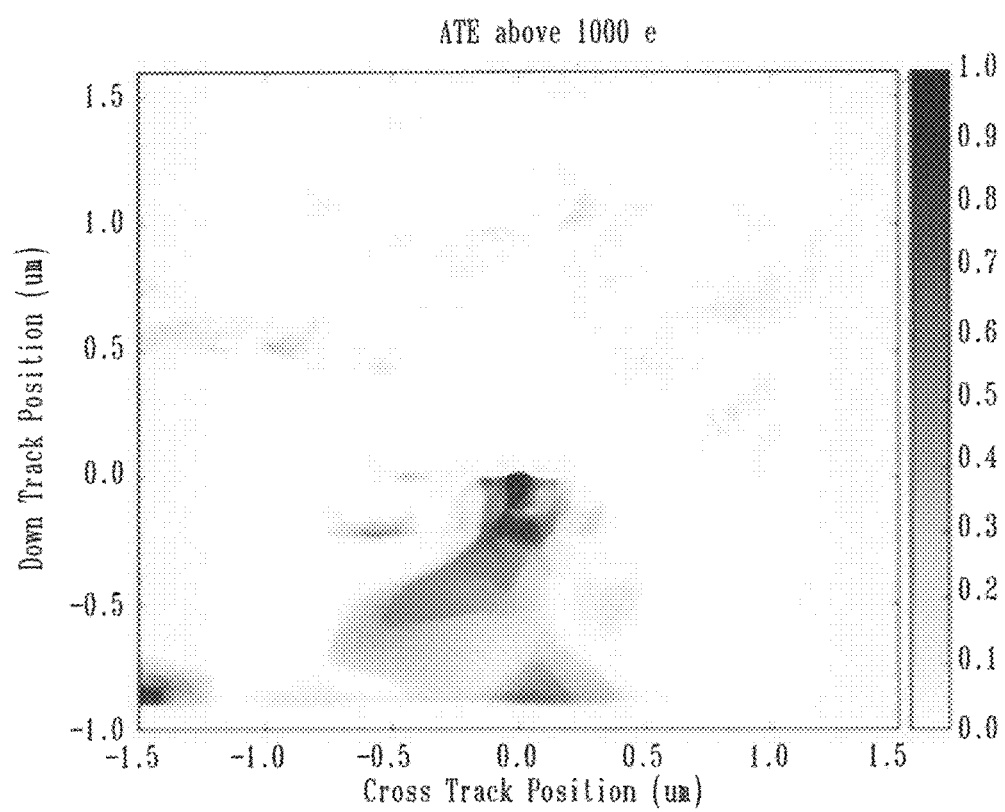
FIG. 4B shows dynamic adjacent track erasure (ATE) mapping from the modeling result for the presently disclosed layered design.

Referring to FIGS. 4A and 4B there is shown the use of dynamic modeling to show the adjacent track erasure (ATE) produced by the prior art head (FIG. 4A) and the head of the present design (FIG. 4B). The writing frequency used in this simulation is 1.5 GHz. In both head designs only the left side of the side shield shows any stray field leakage, indicating that the stray field comes mainly from domain rotation during the write transitions.

The new design (FIG. 4B) shows a cleaner stray field than the prior art design (FIG. 4A). The protection of the bulky side shield by the thin magnetic layer is proved by this modeling. It is to be noted that the dynamic modeling result just performed does not include the dynamic permeability effects in NiFe thin films. However, it has been reported (O. Acher, S. Queste and M. Ledieu, Physical Review B 68, 184414 (2003)) that the permeability of the NiFe thin film drops dramatically under a higher frequency external field. The dynamic behavior will be further influenced by this property. In a new structure like that in FIG. 2B, low frequency writing will behave more like FIG. 2A and high frequency writing will behave more like FIG. 2C. Thus, the effective side gap is indeed adaptive to the writing frequency. Although our simulations have been carried out based on PMR (perpendicular magnetic recording) writing, the design is equally appropriate for use in MAMR and TAMR configurations and other magnetic recording heads.

Figure 5:
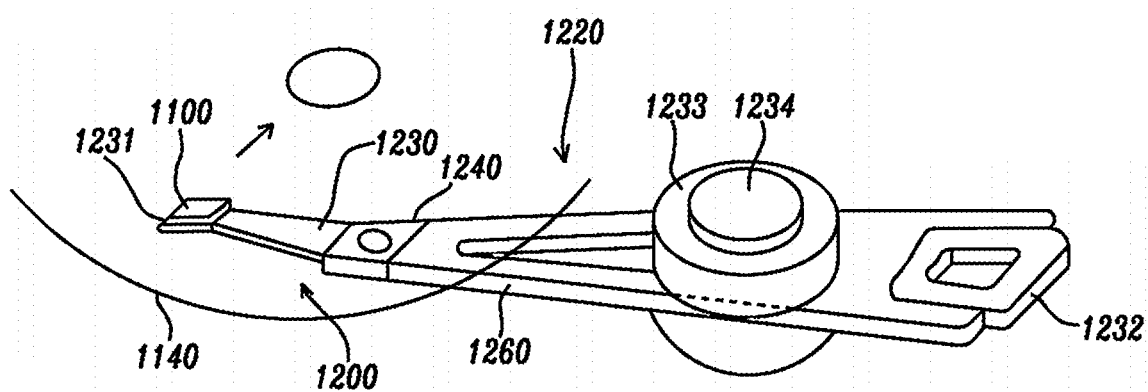
FIG. 5 schematically shows a perspective view of a head arm assembly of the present recording apparatus.
Figure 6:
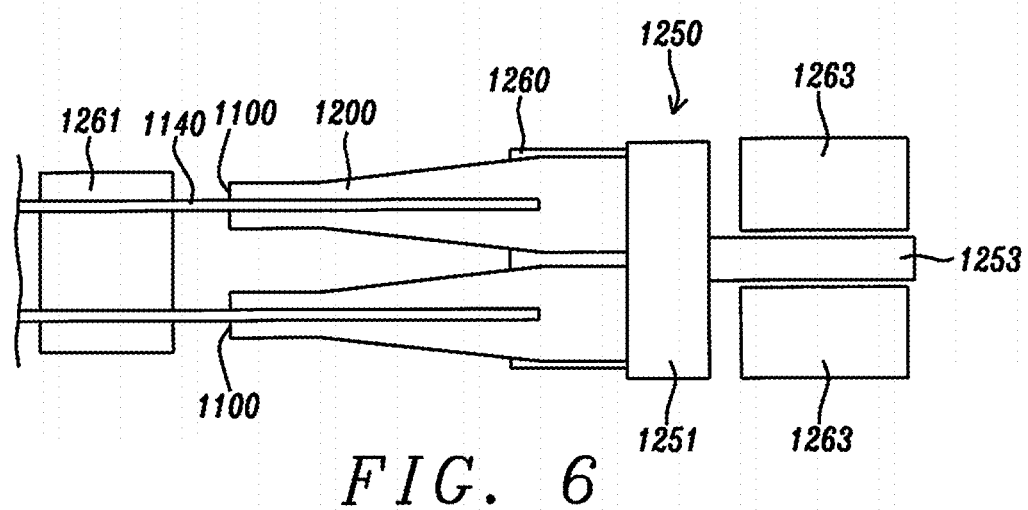
FIG. 6 schematically shows a side view of a head stack assembly of the present recording apparatus.
Figure 7:
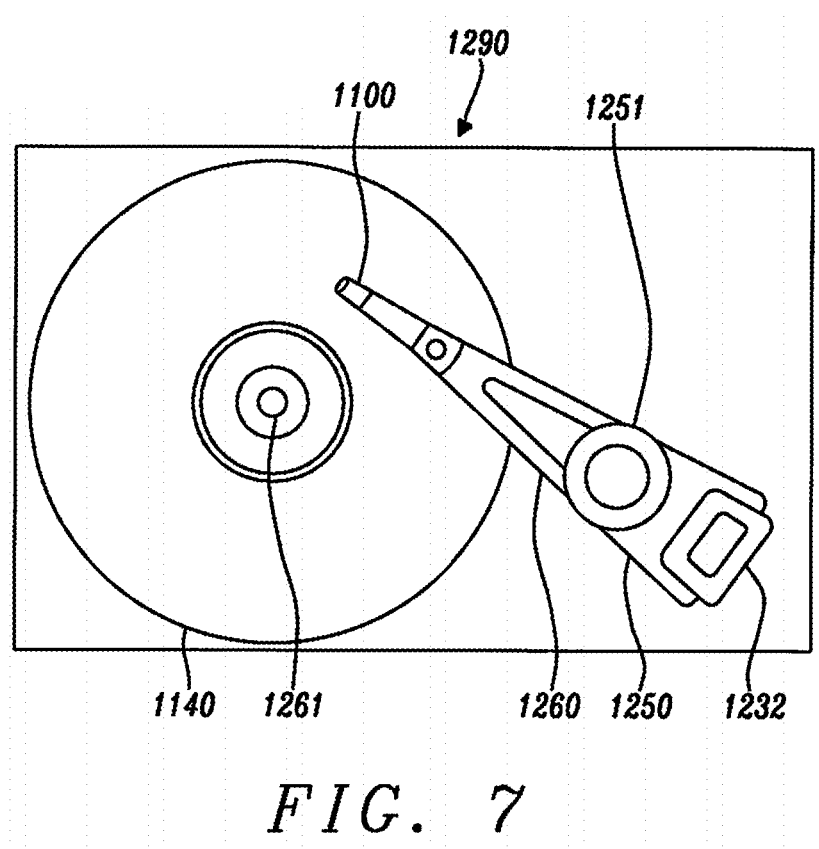
FIG. 7 schematically shows a plan view of the magnetic recording apparatus within which are mounted the components shown if FIGS. 5 and 6.

Referring now to FIGS. 5, 6 and 7, there is shown the elements of a magnetic recording apparatus, such as a MAMR configured hard disk drive (HDD), through whose use the PMR writer described above will meet remaining objects of this disclosure.

FIG. 5 shows a head gimbal assembly (HGA) 1200 that includes a slider-mounted PMR writer 1100, the slider now providing aerodynamic support to the writer when it moves above or below an operational disk recording medium 1140. There is also shown a suspension 1220 that elastically supports the slider-mounted writer 1100. The suspension 1220 has a spring-like load beam 1230 made with a thin, corrosion-free elastic material like stainless steel. A flexure 1230 is provided at a distal end of the load beam and a base-plate 1240 is provided at the proximal end. The slider mounted TAMR writer 1100 is attached to the load beam 1230 at the flexure 1231 which provides the TAMR with the proper amount of freedom of motion. A gimbal part for maintaining the PMR read/write head at a proper level is provided in a portion of the flexure 1231 to which the TAMR 1100 is mounted.

A member to which the HGA 1200 is mounted to arm 1260 is referred to as head arm assembly 1220. The arm 1260 moves the read/write head 1100 in the cross-track direction (arrow) across the medium 1140 (here, a hard disk). One end of the arm 1260 is mounted to the base plate 1240. A coil 1231 to be a part of a voice coil motor (not shown) is mounted to the other end of the arm 1260. A bearing part 1233 is provided to the intermediate portion of the arm 1260. The arm 1260 is rotatably supported by a shaft 1234 mounted to the bearing part 1233. The arm 1260 and the voice coil motor that drives the arm 1260 configure an actuator.

Referring next to FIG. 6 and FIG. 7, there is shown a head stack assembly 1250 and a magnetic recording apparatus in which the slider-mounted TAMR writer 1100 is contained. The head stack assembly is an element to which the HGA 1200 is mounted to arms of a carriage having a plurality of arms for engaging with a plurality of disks 1140. The plurality of disks are mounted on a spindle 1261. FIG. 5 is a side view of this assembly and FIG. 6 is a plan view of the entire magnetic recording apparatus.

Referring finally to FIG. 7, the head stack assembly 1250 is shown incorporated into a magnetic recording apparatus 1290. The magnetic recording apparatus 1290 has a plurality of magnetic recording media 1114 mounted on a spindle motor 1261. Each individual recording media 1114 has two TAMR elements 1100 arranged opposite to each other across the magnetic recording media 14 (shown clearly in FIG. 5). The head stack assembly 1250 and the actuator (except for the write head itself) act as a positioning device and support the PMR heads 1100. They also position the PMR heads correctly opposite the media surface in response to electronic signals. The read/write head records information onto the surface of the magnetic media by means of the magnetic pole contained therein.

As is finally understood by a person skilled in the art, the detailed description given above is illustrative of the present disclosure rather than limiting of the present disclosure. Revisions and modifications may be made to methods, materials, structures and dimensions employed in forming and providing a PMR writer configured for TAMR or MAMR operation having an adaptive gap structure produced by magnetic thin film laminations within dielectric, non-magnetic gap material, while still forming and providing such a structure and its method of formation in accord with the spirit and scope of the present invention as defined by the appended claims.

We claim:

1. A perpendicular magnetic recording (PMR) writer with adaptive gap structure comprising:
    a main magnetic pole (MP) having a trapezoidal, planar, air-bearing surface (ABS) face symmetrically positioned relative to surrounding magnetic shields; wherein
    said trapezoidal face has a narrow leading edge, a trailing edge that is wider than said leading edge and sloping sides connecting said trailing and leading edges; wherein,
    in said ABS cross-sectional plane,
    said MP face is separated from inner edges of said surrounding magnetic shields by a connected series of material-filled gaps comprising:
    a write gap (WG) separating said MP trailing edge from an inner edge of a trailing shield, said WG having a lateral width exceeding said MP trailing edge width;
    a leading edge gap (LG) separating said MP leading edge from an inner edge of a leading shield (LS) and
    a pair of mirror-symmetrically placed side gaps (SG) separating said sloping MP sides from said side shields (SS); wherein
    said two SG intersect said WG and said LG symmetrically, forming a continuous layer completely surrounding said trapezoidal face of said MP; wherein
    said WG is filled uniformly with non-magnetic, non-conducting material; wherein
    said two SG and said LG are filled with non-magnetic, non-conducting material in which are completely embedded N sequentially formed and nested thin layers of magnetic material that are completely surrounded by layers of said non-magnetic, non-conducting material, wherein each of said N thin layers of magnetic material is formed as three continuously connected linear edges that partially surround and are parallel to edges of said MP trapezoidal face with the exception of said WG trailing edge; whereby
    said three connected linear edges of each of said N thin layers of magnetic material are parallel to respective adjacent ones of said sloping sides and said leading edge of said MP trapezoidal face, and are parallel to but separated from inner edges of said SS and LS by layers of non-magnetic, non-conducting material and do not touch adjacent magnetic layers where such layers exist, and terminate at, but do not extend into said WG non-magnetic, non-conducting material, whereby
    if N is greater than 1, said N thin layers of magnetic material are nested symmetrically within each other and are open at said WG; wherein
    said gap structure is adaptable to various writing frequencies as said structure comprising N thin, embedded, nested layers has higher permeability at low frequencies and lower permeability at high frequencies and writability of said PMR is enhanced by said variability.

2. The perpendicular magnetic recording (PMR) writer of claim 1 wherein N=1 and there is one said completely embedded layer of magnetic material and it does not touch either the MP or the surrounding shield material.

3. The perpendicular magnetic recording (PMR) writer of claim 2 wherein the single magnetic layer is separated from the shields and the MP by a non-magnetic, non-conducting layer of thickness between 1 nm and 50 nm adjacent to each side of said magnetic layer.

4. The perpendicular magnetic recording (PMR) writer of claim 1 wherein N=2 and there are two said completely embedded layers of magnetic material that are nested symmetrically within each other and wherein neither embedded layer touches the other or the magnetic material of the MP or said shields.

5. The perpendicular magnetic recording (PMR) writer of claim 1 wherein the thickness of each completely embedded magnetic layer is between 1 nm and 50 nm.

6. A perpendicular magnetic recording (PMR) writer configured for TAMR operation and having an adaptive gap structure, comprising:
    the perpendicular magnetic recording (PMR) writer with adaptive gap structure of claim 1
    a source of optical radiation;
    a waveguide configured to carry said optical radiation to said ABS
    a near-field transducer configured to couple to said waveguide and generate near-field energy at a recording spot on a magnetic recording medium
    said PMR of claim 1, providing a magnetic flux for recording at said spot.

7. A head-gimbal assembly, comprising:
the TAMR-configured read/write head of claim 6
a suspension that elastically supports said TAMR-configured read/write head,
a flexure affixed to said suspension and a load beam having one end attached to said flexure and another end attached to a base plate.

8. A HDD (Hard Disk Drive), comprising:
the head gimbal assembly of claim 7
a magnetic recording medium positioned opposite to said slider-mounted PMR;
a spindle motor that rotates and drives said magnetic recording medium;
a device that supports the slider and that positions said slider relative to said magnetic recording medium.

9. A perpendicular magnetic recording (PMR) writer configured for MAMR operation and having an adaptable gap structure, comprising:
the perpendicular magnetic recording (PMR) writer with adaptive gap structure of claim 1
a source of microwave radiation;
a transducer configured to couple to said microwave radiation and generate microwave energy in the form of resonant precessional motion of magnetic recording bits at a recording spot on a magnetic recording medium;
said PMR of claim 1, providing a magnetic flux for recording at said spot.

10. A head-gimbal assembly, comprising:
the MAMR-configured read/write head of claim 9
a suspension that elastically supports said TAMR-configured read/write head,
a flexure affixed to said suspension and a load beam having one end attached to said flexure and another end attached to a base plate.

11. A HDD (Hard Disk Drive), comprising:
the head gimbal assembly of claim 10
a magnetic recording medium positioned opposite to said slider-mounted PMR;
a spindle motor that rotates and drives said magnetic recording medium;
a device that supports the slider and that positions said slider relative to said magnetic recording medium.

12. A perpendicular magnetic recording (PMR) writer configured for MAMR operation and having an adaptable gap structure, comprising:
the perpendicular magnetic recording (PMR) writer with adaptive gap structure of claim 1
a source of microwave radiation;
a transducer configured to couple to said microwave radiation and generate microwave energy at a recording spot on a magnetic recording medium;
the PMR of claim 1 further configured for spin-assisted writing wherein a spin-torque layer formed within a write gap, assists a flux guiding layer (FGL), also within said write gap, to flip a magnetization in an opposite direction to a write-gap magnetic field, thereby strengthening the magnetic field emerging from the ABS surface of the MP and returning through the trailing shield, thereby providing an enhanced magnetic flux for recording at said spot;
said PMR of claim 1 providing said enhanced magnetic flux.

13. A head-gimbal assembly, comprising:
the MAMR-configured read/write head of claim 12
a suspension that elastically supports said TAMR-configured read/write head;
a flexure affixed to said suspension and a load beam having one end attached to said flexure and another end attached to a base plate.

14. A HDD (Hard Disk Drive), comprising:
the head gimbal assembly of claim 13
a magnetic recording medium positioned opposite to said slider-mounted PMR;
a spindle motor that rotates and drives said magnetic recording medium;
a device that supports the slider and that positions said slider relative to said magnetic recording medium.

* * * * *